(12) United States Patent
Cui

(10) Patent No.: US 9,026,096 B2
(45) Date of Patent: *May 5, 2015

(54) SYSTEMS AND METHODS FOR FACILITATING IDENTIFICATION OF COMMUNICATION ORIGINATORS

(75) Inventor: Yanqing Cui, Beijing (CN)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 229 days.

This patent is subject to a terminal disclaimer.

(21) Appl. No.: 13/604,619

(22) Filed: Sep. 5, 2012

(65) Prior Publication Data

US 2012/0328087 A1    Dec. 27, 2012

Related U.S. Application Data

(63) Continuation of application No. 11/715,541, filed on Mar. 8, 2007, now Pat. No. 8,285,266.

(51) Int. Cl.
| | |
|---|---|
| *H04M 3/42* | (2006.01) |
| *H04L 29/12* | (2006.01) |
| *H04L 29/06* | (2006.01) |
| *H04W 8/00* | (2009.01) |
| *H04L 29/08* | (2006.01) |

(52) U.S. Cl.
CPC ...... *H04L 29/12047* (2013.01); *H04L 61/1594* (2013.01); *H04L 63/08* (2013.01); *H04W 8/005* (2013.01); *H04L 67/10* (2013.01)

(58) Field of Classification Search
CPC ..... H04M 1/575; H04M 3/436; H04M 1/663; H04M 3/42042; H04M 3/487; H04M 1/573; H04M 3/42059; H04M 1/57; H04W 12/06
USPC ............ 379/142.05, 142.06, 142.15, 142.17, 379/88.17, 88.19; 455/411, 566, 567, 445, 455/415
See application file for complete search history.

(56) References Cited

U.S. PATENT DOCUMENTS

| | | | |
|---|---|---|---|
| 7,519,357 B2* | 4/2009 | Vander Veen et al. | 455/415 |
| 7,898,989 B2* | 3/2011 | Ergezinger et al. | 370/259 |
| 8,483,744 B2* | 7/2013 | Takada et al. | 455/525 |
| 2002/0156895 A1* | 10/2002 | Brown | 709/226 |
| 2002/0174188 A1* | 11/2002 | Clark et al. | 709/213 |
| 2003/0026403 A1* | 2/2003 | Clapper | 379/142.06 |
| 2003/0216146 A1 | 11/2003 | Otsuka | |
| 2004/0037403 A1* | 2/2004 | Koch | 379/142.16 |
| 2005/0208971 A1* | 9/2005 | Pappalardo et al. | 455/558 |
| 2006/0046720 A1 | 3/2006 | Toropainen et al. | |
| 2007/0153752 A1 | 7/2007 | Donnellan | |
| 2007/0290787 A1 | 12/2007 | Fiatal et al. | |
| 2007/0291927 A1* | 12/2007 | Batni et al. | 379/372 |
| 2007/0293207 A1 | 12/2007 | Guedalia et al. | |
| 2008/0020742 A1* | 1/2008 | Vander Veen et al. | 455/415 |

(Continued)

FOREIGN PATENT DOCUMENTS

EP    1168769    1/2002

*Primary Examiner* — Simon King

(57) ABSTRACT

Systems, apparatuses and methods for facilitating identification of the originator of a communication. A communication is received from a sending device. Sending device identification information is requested from a distributed contact database fashioned from the contact databases of the communication devices in a group of communication devices. If the sending device identification information is available at a given communication device, it is received from the communication device.

39 Claims, 6 Drawing Sheets

(56) References Cited

U.S. PATENT DOCUMENTS

| | | | |
|---|---|---|---|
| 2008/0037720 A1 | 2/2008 | Thomson et al. | |
| 2008/0045184 A1* | 2/2008 | Randall et al. | 455/412.2 |
| 2008/0125099 A1 | 5/2008 | Brown et al. | |
| 2008/0222127 A1 | 9/2008 | Bergin | |
| 2008/0242322 A1 | 10/2008 | Scott et al. | |
| 2008/0253539 A1* | 10/2008 | Yao | 379/142.05 |
| 2009/0074164 A1* | 3/2009 | Cansler et al. | 379/142.06 |
| 2009/0136013 A1* | 5/2009 | Kuykendall et al. | 379/142.17 |
| 2009/0171979 A1 | 7/2009 | Lubarski et al. | |
| 2009/0186603 A1 | 7/2009 | Usami et al. | |
| 2009/0310765 A1* | 12/2009 | Denny et al. | 379/142.15 |
| 2010/0042717 A1 | 2/2010 | Strandell et al. | |
| 2010/0223294 A1 | 9/2010 | Winslow | |
| 2010/0291909 A1 | 11/2010 | Nagaraja | |
| 2010/0304725 A1 | 12/2010 | Gueron et al. | |
| 2011/0026700 A1* | 2/2011 | Clark et al. | 379/142.15 |
| 2011/0034156 A1 | 2/2011 | Gatti et al. | |
| 2011/0083111 A1 | 4/2011 | Forutanpour et al. | |
| 2011/0085650 A1* | 4/2011 | Cheon et al. | 379/142.05 |
| 2011/0183651 A1 | 7/2011 | Mundy et al. | |
| 2011/0212705 A1 | 9/2011 | Sprigg et al. | |
| 2012/0019365 A1 | 1/2012 | Tuikka et al. | |

\* cited by examiner

SYSTEMS AND METHODS FOR FACILITATING IDENTIFICATION OF COMMUNICATION ORIGINATORS

CROSS REFERENCE

This application is a continuation of US Publication US2008-0222293A1 (U.S. Ser. No. 11/715,541) filed on Mar. 8, 2007 and titled SYSTEMS AND METHODS FOR FACILITATING IDENTIFICATION OF COMMUNICATION ORIGINATORS, the entire disclosure of which is incorporated herein by reference.

FIELD OF THE INVENTION

This invention relates in general to communications, and more particularly to systems, apparatuses and methods for facilitating identification of the originator of a communication.

BACKGROUND OF THE INVENTION

Technological advances in communication infrastructures and protocols have turned standard computing devices into valuable communication tools. Computers communicate with each other, and with other electronic devices, over networks ranging from Local Area Networks (LANs) to wide reaching Global Area Networks (GANs) such as the Internet. Other electronic devices have experienced similar transformations, such as mobile phones, Personal Digital Assistants (PDAs), and the like. Today, these wireless devices are being used for a variety of different types of communication. For example, current mobile phone and PDA technologies have transformed these wireless devices into powerful communication tools capable of communicating voice, text or other data, documents, images, video and other multimedia content (generally referred to herein as communications).

PDAs, once the portable calendaring and organizational tool, now often include network communication capabilities such as e-mail, Internet access, etc. Conversely, mobile phones and other traditional communication devices now often include local applications such as calendars, phonebooks or other contact lists, task lists, and other organizational tools. Tools such as contact lists assist the communication device user with placing voice calls and/or directing electronic messages to intended recipients of the communications. For example, a local contacts application can be accessed by the communication device user to help the user recollect contact addresses or other identifiers, and can provide the user with a platform from which contacts can be directly designated as intended recipients of a new communication.

Despite these advances, the recipient of a call or message may not be able to determine the actual identify of the originator of the call/message. If the local contact database in the recipient device has a stored record for the phone number or source address of the incoming call/message, the originator's identity can be determined if that identity has been correlated with the phone number/source address of the incoming call/message. However, if that phone number or source address is not part of a record in the recipient device's local contact database, or if the actual identity (e.g., name) of the person was not correlated with the phone number or source address in the local contact database, the recipient may not be able to determine who is the source of the phone call or message.

Thus, many calls or messages may be received from an unrecognized number or address. When a call/message recipient receives a call/message from a new number or address, the recipient often avoids directly asking the name of the sender. It can take significant time and effort to determine who the sender actually is, and in some cases the sender's identity cannot even be determined.

Accordingly, there is a need in the industry for a manner of determining the identity of a call/message originator where the recipient device does not recognize the originator of the call or message. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for facilitating identification of the originator of a communication.

In accordance with one embodiment of the invention, a method is provided that includes receiving a communication from a sending device, and requesting sending device identification information from a distributed contact database. The distributed contact database is fashioned from the contact databases of the communication devices in a group of communication devices. The requested sending device identification information is received from at least one of the communication devices in the group.

According to more particular embodiments, the method includes consulting a local contacts database for the sending device identification information and requesting the sending device identification information from the distributed contact database if the sending device identification information is not available in the local contacts database. In another embodiment, only a portion of the contact database of a given one of the communication devices is made available for use in the distributed contact database. In another embodiment, receiving a communication involves receiving a voice call or a message from the sending device. Another embodiment involves receiving a notification from one or more of the communication devices indicating that the requested sending device identification information will not be provided by the respective one of the communication devices. In still another embodiment, requesting sending device identification information involves requesting information at least identifying a user of the sending device.

According to still more embodiments of such a method, requesting sending device identification information involves requesting information more specifically identifying a user of the sending device than the information received in connection with the communication from the sending device. In a more particular embodiment, the information received in connection with the communication from the sending device includes information obtained in connection with a calling line identity technology. In another particular embodiment, the information received in connection with the communication from the sending device includes a phone number. In another embodiment, the information received in connection with the communication from the sending device includes at least a messaging address associated with the sending device. In still another embodiment, the information received in connection with the communication from the sending device includes at least a messaging address associated with a user of the sending device.

Still other embodiments of such a method include requesting sending device identification information by requesting the sending device identification information from each participating communication device in the group. In another embodiment, requesting sending device identification information involves sending a request(s) for the sending device identification information to each of the communication devices of the group. Another embodiment involves presenting the received sending device identification information.

In accordance with another embodiment of the invention, a method is provided that includes a device becoming associated with communication devices to collectively formulate a distributed contact database. A request is received from a requesting one of the plurality of communication devices for identification information based on partial identification information provided via the request. The requested identification information is provided to the requesting communication device if the local contact database includes the requested identification information.

More particular embodiments of such a method involve applying participation rules, and providing the requested identification information to the requesting communication device if the local contact database includes the requested identification information and if the participation rules allow it. Another embodiment involves determining whether the requested identification information is approved for sharing, and if approved, providing the requested identification information to the requesting communication device if the local contact database includes the requested identification information. Another embodiment involves notifying the requesting communication device that the requested identification information will not be provided to the requesting communication device. Still another embodiment involves providing an option to respond to the request within a time period, and performing a default operation if no action is taken by the expiration of the time period.

Another embodiment of such a method involves determining whether the requesting communication device is associated with an authenticated user having permission to obtain the identification information. A more particular embodiment involves notifying the requesting communication device that the requested communication device is available, if the requesting communication device is associated with an authenticated user. A still more particular embodiment involves receiving, in response to the notification, a request for the identification information from the requesting communication device that is associated with the authenticated user. In one embodiment, at least a portion of the local contact database is made ineligible for inclusion in the distributed contact database In accordance with another embodiment of the invention, a method is provided that involves a first device receiving a communication from a sending device. The first device requests sending device identification information from a distributed contact database fashioned from the contact databases of one or more second devices. Each of the second devices search their respective contact databases to locate the requested sending device identification information, and if found sending the sending device identification information to the first device.

More particular embodiments of such a method include affiliating the first device and the one or more second devices as a first tier group of the distributed contact database, and where requesting sending device identification information from a distributed contact database comprises requesting sending device identification information from the first tier group of the distributed contact database. Another particular embodiment of such a method involves affiliating at least one of the second devices with one or more third devices as a second tier group of the distributed contact database, and where sending the sending device identification information to the first device comprises receiving the sending device identification information from the second tier group and forwarding the sending device identification information to the first device.

In accordance with another embodiment of the invention, an apparatus is provided that includes a receiver to receive a communication from a sending device. A processor is configured to create a request for identification information of the user associated with the sending device. A transmitter is configured to transmit the request to a group of communication devices whose individual contact databases collectively form a distributed contact database. The receiver is configured to receive the requested identification information from at least one of the communication devices of the group.

More particular embodiments of such an apparatus include a local contacts database, where the processor is further configured to search the local contacts database for the identification information of the user before directing the transmitter to transmit the request to the group of communication devices. In another embodiment, the processor is further configured to direct the transmitter to transmit the request to the group of communication devices only if the identification information could not be located in the local contacts database. In yet another embodiment, the receiver is further configured to receive a notification from one or more of the communication devices indicating that the requested identification information will not be provided by the respective one of the communication devices. The apparatus may include a display to present a visual representation of the requested identification information, and/or a speaker to present an audio representation of the requested identification information.

In accordance with another embodiment of the invention, an apparatus is provided that includes a receiver to receive a contact item request, and a local contact database representing a subset of a distributed contact database. A processor is also provided to search the local contact database to determine whether the requested contact item is stored in the local contact database of the distributed contact database. A transmitter transmits the requested contact item if the requested contact item is stored in the local contact database of the distributed contact database.

In a more particular embodiment of such an apparatus, the receiver is configured to receive the contact item request from a requesting device, and the transmitter is configured to transmit the requested contact item to the requesting device if the requested contact item is stored in the local contact database of the distributed contact database. In another embodiment, a plurality of such apparatuses provide a system where the local contact databases of the plurality of apparatuses collectively represent the distributed contact database.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
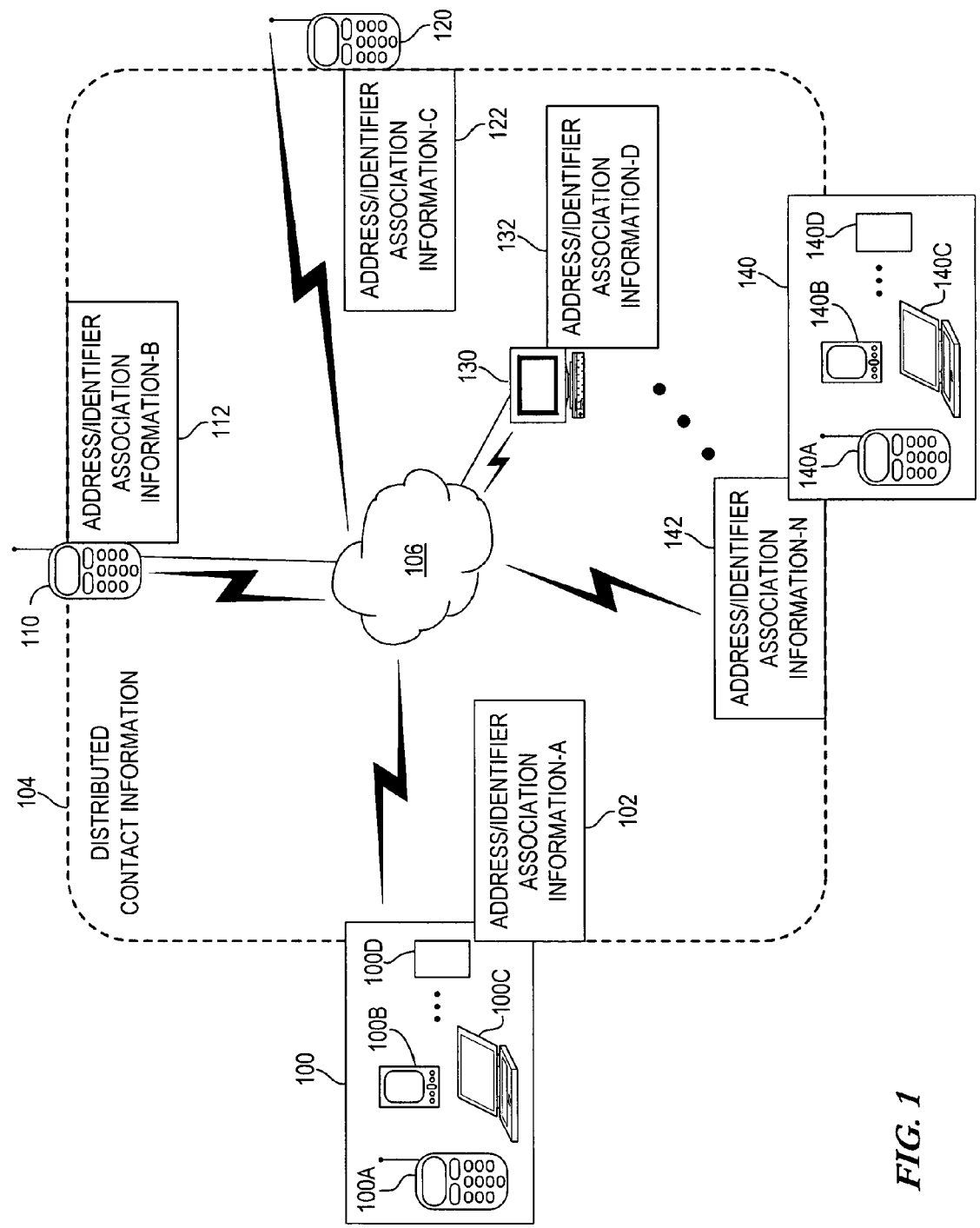
FIG. 1 is a block diagram generally illustrating an embodiment of a shared contact distribution system and methodology in accordance with the present invention.

In the following description of exemplary embodiments, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides systems, apparatuses and methods for facilitating identification of the originator of a communication(s) such as a voice call, text message or the like. This may be desirable, for example, when the recipient of the communication cannot otherwise adequately identify the communication originator. Using a distributed approach, one or more distributed identification databases, such as contact/phonebook databases associated with one or more other devices, are accessible by the communication recipient to assist in the identification of the communication originator. Thus, one aspect of the invention supports call/message originator identification by sharing individual identification databases (e.g., contact database, electronic phonebook, etc.). Thus, after receiving a communication such as a voice call, message or other communication from an otherwise unrecognized address/number, the recipient device can search for the communication originator's identifier by querying the phonebook(s) of, for example, his or her friend(s) or other members of a group.

Communication device users may receive communications from people in various forms, including but not limited to voice calls, e-mails, text messages (e.g., short message service), multimedia messages (e.g., multimedia messaging service), instant messages (IM), and any other similar item that can be communicated to the communication device. From a social perspective, call/message recipients typically avoid directly asking the name of the caller/sender when the recipient receives the call/message from a new or otherwise unknown number/address. More particularly, if there is no link between a phone number or message address and a corresponding name (e.g., surname, full name, known nickname, etc.), then the user either needs to remember the number/address presented to the recipient, or otherwise fail to identify the calling/sending party. For example, if the user does not have the calling/sending party listed in his or her local contact list (e.g., electronic phonebook), the name of the calling/sending party will not be presented to the call/message recipient. Thus, it can take a significant amount of time and/or effort to determine who the calling/sending party is, and in some the calling/sending party may not be able to be identified at all. The present invention addresses these and other problems of the prior art.

References herein to a "caller," "sender," "sending party" or similar term is to be understood to include any type of communication initiator, including but not limited to the initiator of a voice communication, text message, multimedia message, instant message, e-mail, or any other type of communication that can be delivered to a communication device. Similarly, references to a recipient or receiving party of a communication can include a recipient of any type of communication (e.g., voice, text message, SMS, MMS, instant message, e-mail, etc.). Thus, while traditionally an initiator of a voice communication is referred to as the caller or calling party, such an originator of a voice communication may also be referred to herein as the sender or sending party. Similarly, the initiator of any type of electronic message may be referred to as the caller or calling party, in addition to the sender, sending party, etc. In addition, terms such as "call" and "message" and analogous terminology may be used interchangeably herein unless otherwise noted.

FIG. 1 is a block diagram generally illustrating an embodiment of a shared contact distribution system and methodology in accordance with the present invention. A communication device 100 represents a device that receives a message (which, as indicated above, can include any type of communication including a voice call, e-mail, text message, instant message, etc.). The receiving device 100 may be, for example, a mobile phone 100A, personal digital assistant 100B, computing device 100C or other device 100D capable of communicating information. The computing device 100C represents any type of computing device capable of communicating information, including a laptop or notebook computer (or analogous), desktop or workstation computer (or analogous), etc. Such computing devices may communicate via e-mail, instant messaging, text/multimedia messaging, voice communications, voice over internet protocol (VoIP), and/or other manners of communication. Associated with the device 100 is a local database or other storage that includes address/identifier association information-A 102. This information 102 includes phone numbers or message addresses that may be linked or otherwise associated with an identifier of the user and/or equipment associated with the respective phone number or message address.

For example, the information 102 may be represented by an electronic phonebook or other contact database. The user of the device 100 can populate the contact database by associating the name or other identifier of a person with one or more numbers, addresses, etc. As a more particular example, one such "record" of the contact database may include the name/identifier "John A. Smith," whose mobile phone number linked to that record is 999-555-1212, and whose e-mail address linked to that record is jas2007@somedomain.com. The address/identifier association information-A 102 may include any number of such records.

When the device 100 receives a message (including a call), some technologies exist to notify the device 100 of the number or address from which the message originated. For example, if a user of a calling device initiates a voice call to the device 100, the device 100 may be presented with the phone number of the initiating device. For landline telephone systems, such notification systems are commonly referred to as calling number identification (CNID), calling line identification presentation (CLIP), call capture, and caller identification (CID) to name a few. Mobile networks also may employ their own caller identification technologies. For example, IP multimedia subsystem (IMS) refers to a networking architecture particularly suited for providing multimedia services, which utilizes caller line identification (CLI). As with the previously mentioned caller identification technologies, CLI is a service supplied by phone service providers where the phone number (e.g., Mobile Station Integrated Services Digital Network Number or "MSISDN") is transmitted when the phone call is made. In an IMS or other similar system, multimedia may also accompany the number or address provided, such as in a multimedia Caller Line Identification (MCLI) service. MCLI refers to CLI where multimedia content accompanies the phone number, or is provided in lieu of the phone number. For example, a digital picture of the caller may be transmitted, and/or an audio clip, graphics, corporate logo, and/or the like.

Messaging technologies are similar, in that they may provide an indication of the address of the device sending the message. For example an e-mail address, instant message address or alias, phone number or other "address" of the sending device may be sent to the recipient device. As one example, an e-mail typically includes header information that includes the address of the source device, thereby enabling it to be presented to the recipient. From the description provided herein, one skilled in the art will readily appreciate that the present invention is applicable in connection with any technology where a communication identifier of the originating device is provided to the recipient device(s), such as sent from the sending device via a signaling or control channel, sent from an intermediary network device, etc.

While these technologies provide some level of identification of the originator of the message, they do not necessarily specifically identify the person associated with that identifier. For example, if a caller identification system provides the phone number 999-555-1212 to the recipient, this does not indicate to the user of the recipient device who the actual calling party is. Similarly, if an e-mail address of jas2007@somedomain.com is received by or otherwise made known to the recipient, it does not necessarily reveal the actual identity (e.g., John A. Smith) of the person that corresponds to that e-mail address.

The address/identifier association information-A 102 may provide such a correlation. For example, where the information-A 102 is represented by a local electronic phonebook in a mobile phone, the record for John A. Smith may be associated with one or more contact "addresses," such as phone number 999-555-1212 and/or the e-mail address of jas2007@somedomain.com. Thus, if the caller ID-compliant device 100 receives a call from 999-555-1212, this can be correlated with the name (identifier) "John A. Smith," thereby enabling the recipient to become aware of the actual person who initiated the call.

However, the device 100 may not include the received number or other address within its own address/identifier association information-A 102. It therefore may not be capable of correlating an actual name/identifier with the received number or address. In accordance with embodiments of the present invention, such a device 100 may seek the information from the distributed contact information 104 to serve as or supplement its own contact information or other address/identifier association information-A 102. In the illustrated example, representative peer devices 110, 120, 130 and 140 represent at least a part of a group of participating communication devices that can search their respective address/identifier association information databases 112, 122, 132 and 142 for the needed caller information correlating to the received number or address. If any of the group members 110, 120, 130 through 140 have identification information corresponding to the number/address, this information can be provided to the call/message recipient device 100.

The information may be provided via any type of network(s) 106. For example, the network(s) 106 may include the cellular network by which the devices can communicate, such as a GSM/GPRS network or other infrastructure-based network capable of communicating contact data. Another example may involve a proximity network(s), such as in the case of Bluetooth, wireless local area network (WLAN), etc. Another example includes peer-to-peer networks. Another embodiment may involve a broadcast request by the recipient device 100, and direct responses such as via short message service (SMS) or other text/multimedia messaging, e-mail, etc.

Figure 2:
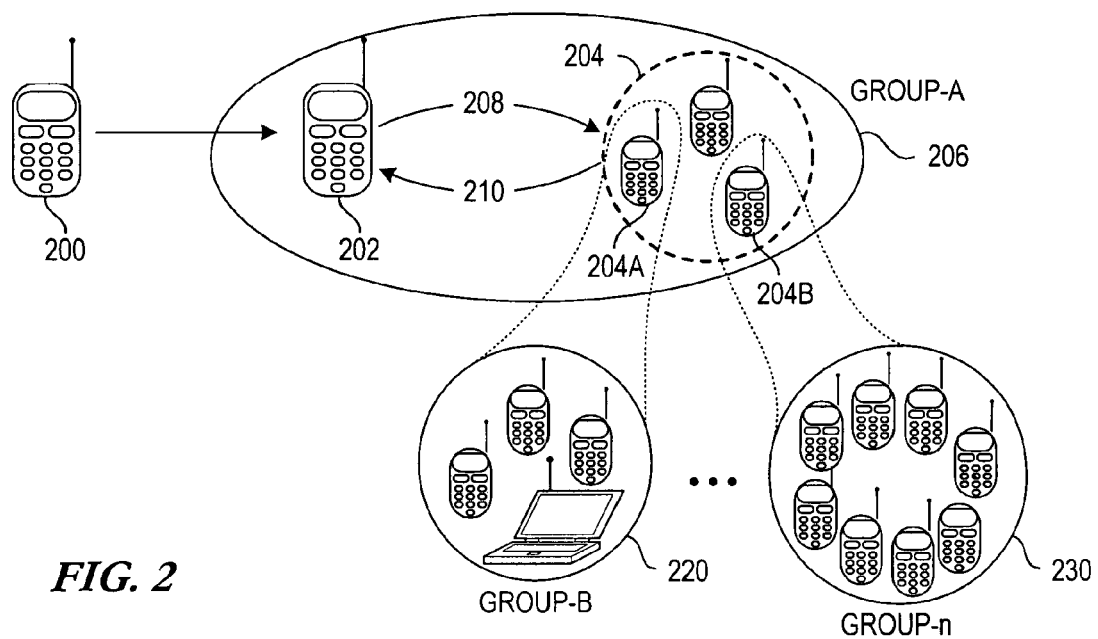
FIG. 2 generally illustrates one embodiment of a manner in which a requesting device obtains contact information from another device(s) in a distributed network including one or more distribution groups.

FIG. 2 generally illustrates one embodiment of a manner in which a requesting device 202 may obtain contact information from one or more other devices in a distributed network including one or more distribution groups. In one embodiment, a calling/sending device 200 (hereinafter referred to as the sending device) initiates a communication to the receiving device 202, which also represents the requesting device in the present example. It is assumed that the receiving device 202, upon receiving a message from or establishing the communication with the sending device 200, receives at least some identifier(s) corresponding to the sending device 200 and/or its user. Such an identifier(s) may include, for example, an e-mail address, instant messaging identifier, phone number, MSISDN, etc. Because such an identifier may be unrecognizable or obscure, the user of the receiving device 202 may not be able to ascertain the actual identity of the user of the sending device 200. In accordance with one embodiment of the invention, the receiving device 202 may contact one or more other devices 204 that, together with the receiving device 202, form a distributed contact group (e.g., group-A 206). Thus, the receiving device 202 requests 208 more specific identification of the sending party 200 by providing the received identifier(s) (e.g., e-mail address, phone number, etc.) to the other devices 204 of the group 206. If any of the device(s) 204 serving as the distributed contact information can provide the more specific identification of the sending party 200 based on the received identifier(s), it/they can return 210 the relevant information to the requesting device 202.

In one embodiment, the realm of the distributed contact information extends beyond the requesting device's 202 own group 206. For example, the requesting device 202 may be associated with multiple groups 206, 220, 230, etc. In other words, the requesting device's pool of distributed contact information can involve any one or more groups of users willing to share their contact information with those affiliated with the group.

However, in other embodiments, a member of one group may in turn reach out to another group(s) to in effect expand the distributed contact information pool. For example, the requesting device 202 may request information from the members affiliated with group-A-206, and one or more of these group members 204 may in turn request the information from other groups 220, 230 to which they are also affiliated. More particularly, the device 204A may also be affiliated with group-B 220, and may request the specific identification information from members of that group-B 220. Similarly, another member 204B may request the information from members of its other group(s), namely group-n 230. Whether expanding the distributed contact information network in this manner is allowed can be the decision of the members 204, or can be the decision of the initial requesting device 202, or otherwise. Limits can also be placed on the number of groups to which a request may be forwarded, so that the request does not proliferate beyond a reasonable "supergroup" of users. For example, if the members 204 do not have the information, a request may be made to groups 220 and 230, but it may not be allowed for members of groups 220, 230 to forward the request as the likelihood of recognition of the initial sender 200 may become more remote. In other embodiments, there may be no such limits placed on the size or expansion of the distributed contact information pool.

Figure 3:
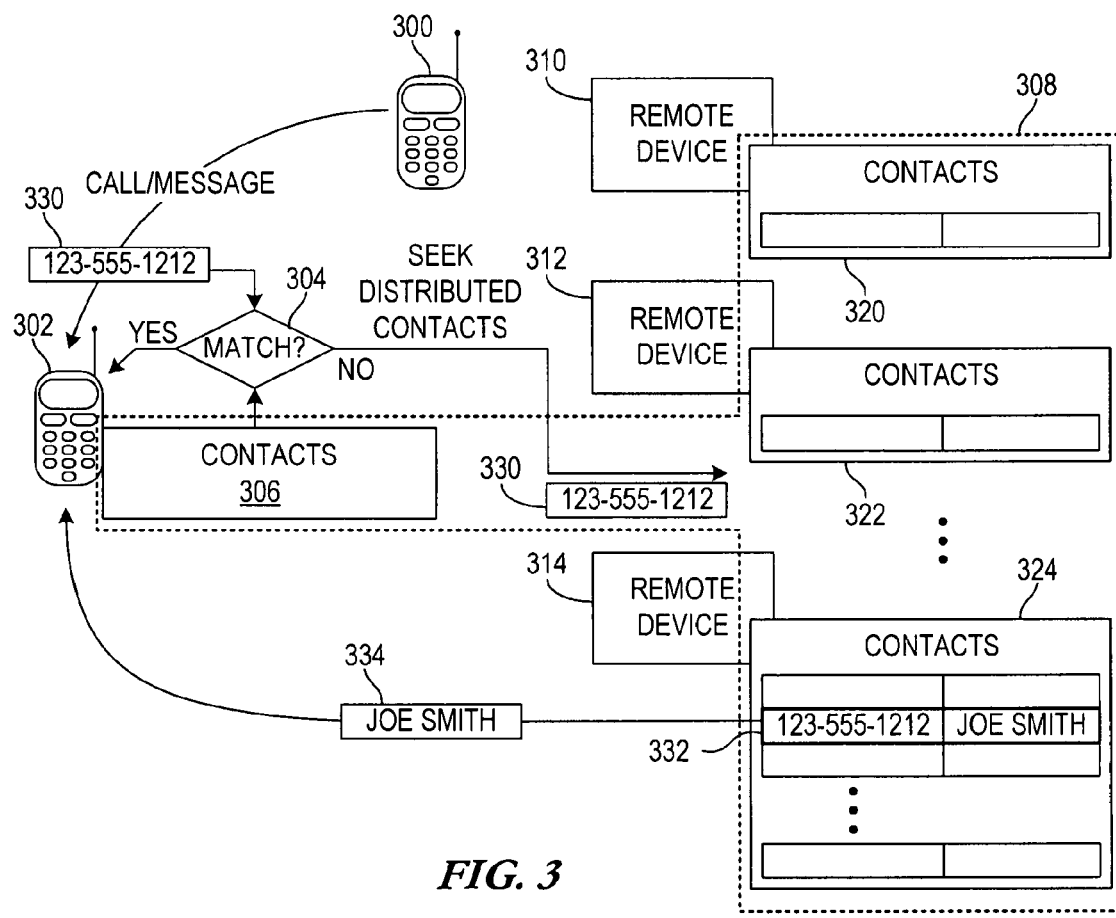
FIG. 3 is a block diagram illustrating a representative manner in which a device can obtain caller/sender identification information using a distributed contact information database in accordance with the present invention.

FIG. 3 is a block diagram illustrating a representative manner in which a device can obtain caller/sender identification information using a distributed contact information database in accordance with the present invention. In the illustrated embodiment, it is assumed that a voice call has been initiated by the calling device 300 to the receiving device 302, although the example is equally applicable to other communication types such as e-mail, text messaging, etc.

The illustrated calling device has a phone number, such as an MSISDN, of "123-555-1212" in the present example. If the receiving device 302 can identify the user of the device 300 by a match 304 in its local contacts 306, then the caller's identity is shown or otherwise presented to the user via the receiving device 302. If the device 302 does not include the information in its database 306, then it seeks the information via the distributed contact information 308. This distributed contact information essentially increases the device's 302 contacts 306 to a larger distributed contact database 308 that also includes at least some contact information from one or more other devices depicted as remote devices 310, 312, . . . 314. Some or all of these devices 310, 312, 314 may include associated contact databases. For example, in the illustrated embodiment the device 310 has an associated contact database 320, the device 312 has an associated contact database 322, and the device 314 has an associated contact database 324. The sender's identification information, the phone number "123-555-1212" 330 in the present example, is sent to the remote devices 310, 312, 314 to determine if any one or more of these devices has more specific identification information than the data 330 provided. If so, this information is returned to the requesting device 302.

A more specific use case is now described, which is intended to represent only an exemplary manner in which the present invention can be utilized. The invention is clearly not limited to the example of FIG. 3. Assume that "Joe Smith" is the name of the user of the device 300 initiating a call to the user of device 302. For purposes of this example, assume that the devices 300 are mobile devices, such as a mobile phone. When the device 300 calls the device 302, the device 302 may be aware of the device's 300 phone number 330, due to caller line identification technology. Assume that the local contact database 306 does not include any record or other entry that includes the caller's number 330, or that the contact database 306 simply does not includes any more specific information associated with that caller's number 330. In such case, the device 302 can send the caller's number 330 to other devices 310, 312, 314 to request the information from any one or more of those devices. In the illustrated embodiment, it is assumed that the remote device 314 has a contact record 332 for the number 330 (i.e., 123-555-1212). The contact record 332 includes more detailed information than the phone number 330, namely the calling party's given name "Joe Smith." This data 334 is then returned to the requesting device 302, where it can be presented visually, audibly, and/or otherwise made known to the user of the device 302.

Figure 4:
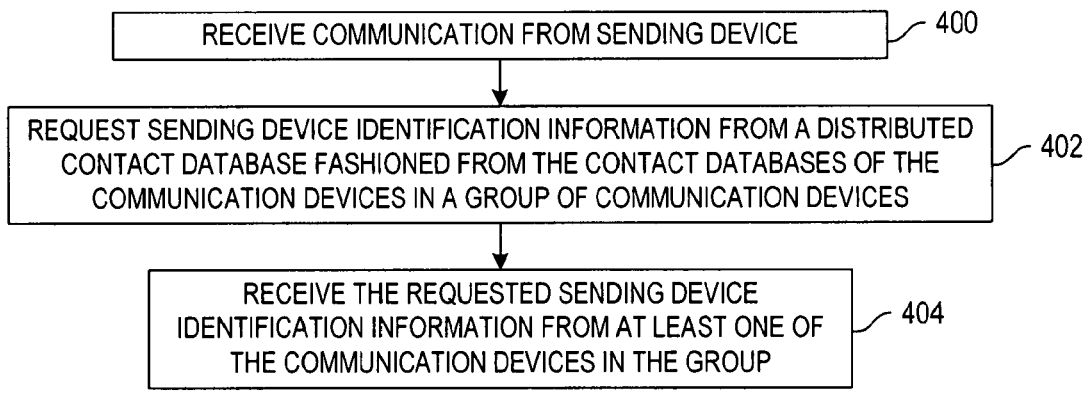
FIGS. 4 and 5 are flow diagrams illustrating representative embodiments of methods for obtaining contact information via a distributed contact database in accordance with the invention.

FIG. 4 is a flow diagram illustrating one embodiment of a method for obtaining contact information via a distributed contact database in accordance with the invention. Some communication is received 400 from a sending device. As previously indicated, this may be any type of communication (e.g., voice call, e-mail, instant message, text or multimedia message, etc.). Identification information relating to the sending device is requested 402 from a distributed contact database fashioned from the contact databases of a group of communication devices. The requested sending device identification information is received 404 from at least one of the communication devices in the group.

Figure 5:
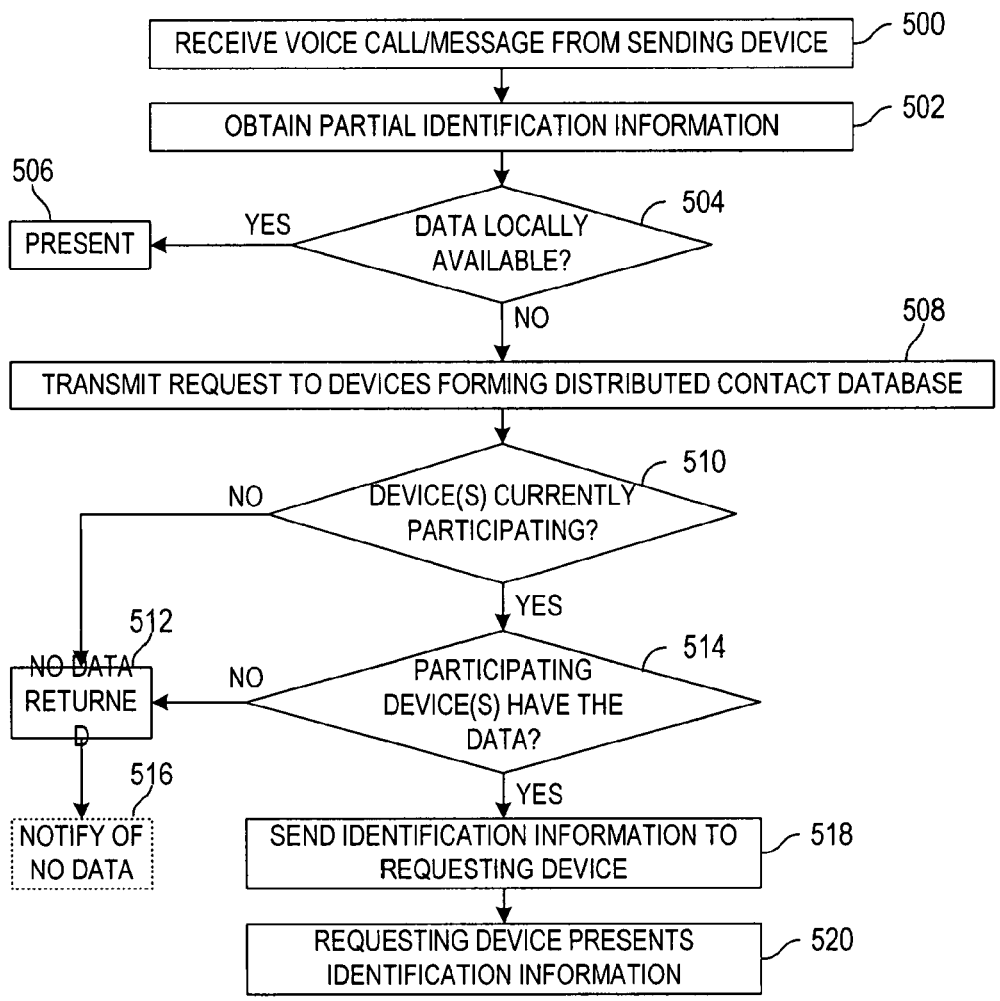

FIG. 5 illustrates a flow diagram illustrating another embodiment of a method for obtaining contact information via a distributed contact database in accordance with the invention. In the illustrated embodiment, a voice call or message (or other communication) is received 500 from a sending device. For example, the sending device may be a mobile phone, computer, PDA, etc. The receiving device obtains 502 partial identification information. This partial identification information may be obtained by way of the communication itself, such as a source address in a packet header of an e-mail or other message. The partial identification information may also be obtained through technologies such as calling line identity technologies (e.g., CID, CNID, CLI, MCLI, etc.) that provide such partial identification information. This partial identification information may include, for example, a phone number, e-mail address or other messaging address, or the like. For purposes of the description of FIG. 5, "partial" identification information involves information that is less than the specificity of the information desired by the communication recipient. For example, being presented with a phone number provides some level of "identification" of the calling party, but does not provide sufficient information for the recipient to know specifically who is calling, unless the recipient knows that the number belongs to a particular person.

Using the partial identification information, the device can determine 504 whether the data (i.e., the more specific identification information) is available locally. This can be determined 504 by, for example, querying a local contacts database. If the data is locally available, it can be presented 506 to the user. If the data is not locally available, a request is transmitted 508 to the devices forming the distributed contact database to obtain the more specific identification information. A device(s) that is associated with the group may not, however, be currently participating in the distributed contact group. For example, if the group device is not powered on, it cannot process the request or send any data. As another example, the user of the group device may have an option selected or profile activated that indicates that it does not currently want to be a provider of information in the distributed contact database. Other examples of situations where the device may want to temporarily opt out of participation in the distributed contact database include a low battery, insufficient signal strength, out of network (e.g., roaming), etc.

Another example may be that the device is not participating at least for the requested database record. For example, some phone numbers, addresses and/or other contact information may be expected to remain private, and the device user can designate certain contacts as private or otherwise unavailable for providing to other users. As a more particular example, assume that a requesting device requests specific identification information for a MSISDN of 123-555-1212. A particular device, DEVICE-A, associated with the distributed contact database may have this number in its local database, but the person (e.g., Joe Smith) associated with the MSISDN of 123-555-1212 has given the contact information only to DEVICE-A with instructions to keep the contact information secret. In such a case, the DEVICE-A will not respond with the name "Joe Smith" even though the DEVICE-A is otherwise participating in the distributed contact database. Whether a device is a participating device for the particular situation can, therefore, be based on the aforementioned and/or other participation rules.

The aforementioned are merely representative examples of non-participating devices for purposes of the particular request. In one embodiment, it is determined 510 whether the devices of the group are participating. This may be known to the requesting device in advance, such that no request would be sent to that non-participating device(s), and/or this may be determined by the group member device upon receipt of the request. If the device is not participating, no data is returned as shown at block 512. If any of the devices are participating, it is determined 514 whether the devices have the data. This may be determined, for example, by each of the participating devices querying its respective local contact database(s) to locate the specific information corresponding to the partial contact information provided by the requesting device. If none of the participating devices have the data, no data is returned as shown at block 512, and a notification of this may optionally be sent 516.

If any of the participating devices have the requested identification information, it is sent 518 to the requesting device. The requesting device may then present 520 the identification information to the user. For example, the identification information may be presented via a display of the requesting device, or audibly via a speaker(s) of the requesting device, etc.

Figure 6A:
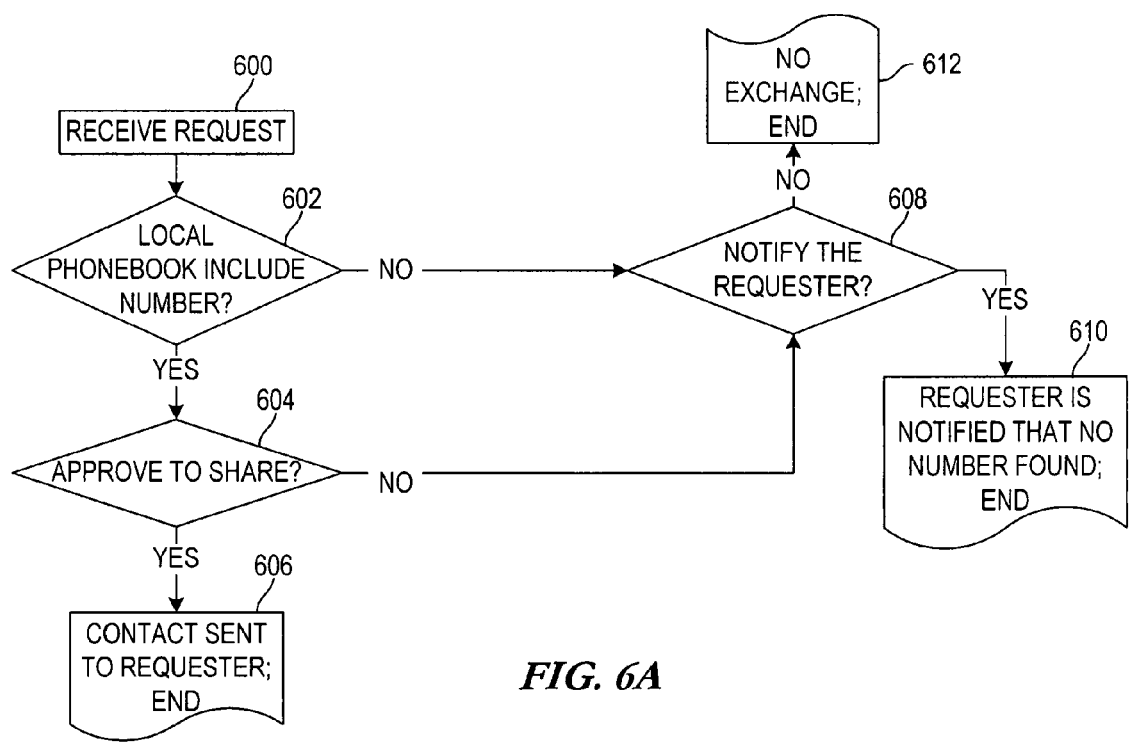
FIGS. 6A, 6B and 6C illustrate flow diagrams of exemplary embodiments of various approaches for providing the requested contact information in accordance with the invention.
Figure 6B:
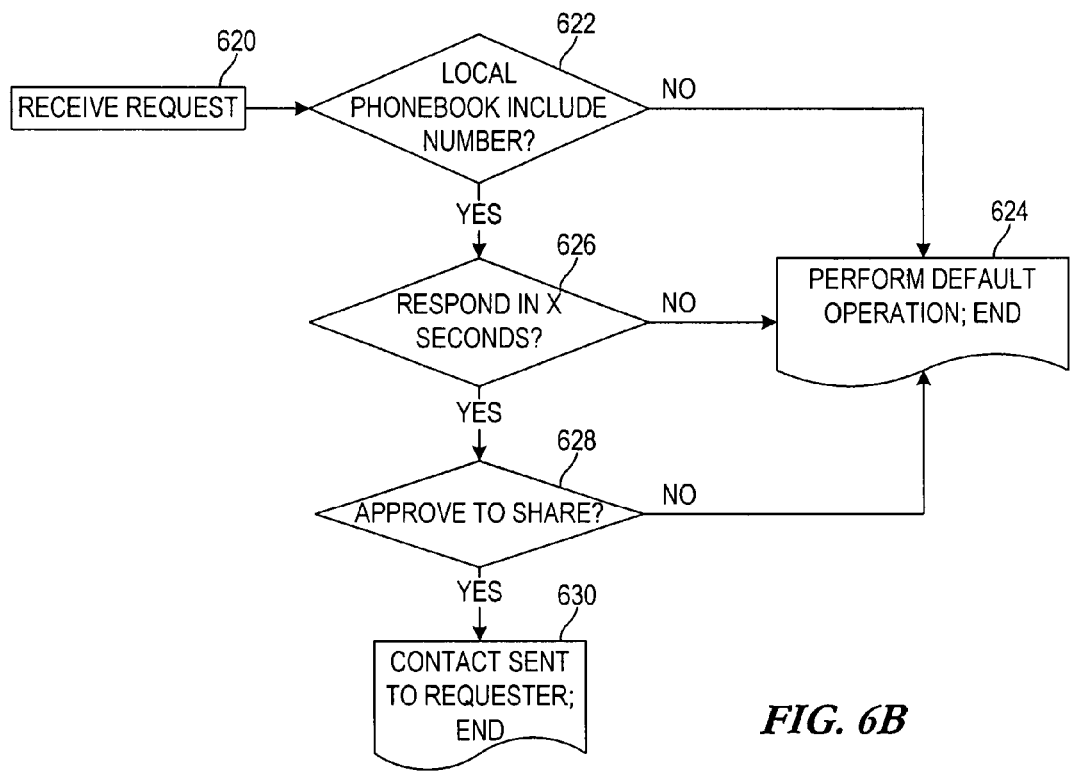
Figure 6C:
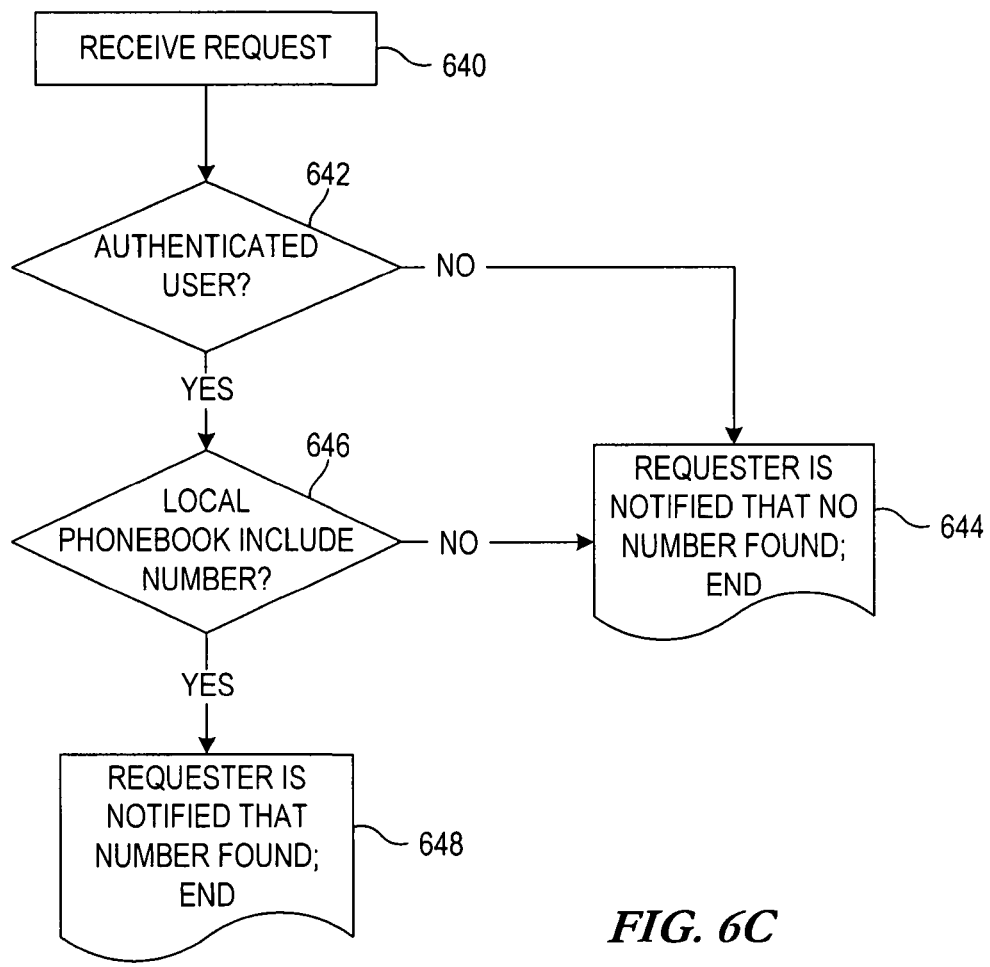

FIGS. 6A-6C illustrate flow diagrams of exemplary embodiments of various approaches for providing the requested contact information in accordance with the invention. While FIGS. 6A-6C are described in terms of a phone number, it is equally applicable to message addresses. FIG. 6A involves an approach where the group member devices are aware of the process, and is considered from the viewpoint of a group member device receiving a request for the contact information. Particularly, the group member receives 600 a request for contact information. For example, the requesting device may send a request to each of the members of the group, where the group member of FIG. 6 is one of those group members. If the requested information is found in the local phonebook/contact database as determined at decision block 602, it is determined 604 whether the group member device has permission to share the information. If so, the contact information is sent 606 to the requesting device. If the device is not approved to share the information (block 604), or the local phonebook does not include the number (block 602), it is determined 608 whether the requester will be notified of such. If not, there is no exchange of information, and the requester is not notified that the device could not be of assistance. Otherwise, the requester is notified 610 that no number was found.

FIG. 6B involves a time lapse approach, and is again considered from the viewpoint of a group member device receiving a request for the contact information. In this embodiment, interaction is involved only if the group member user wants to share the contact(s), where other conditions may be managed via a default setting. As will be described in connection with FIG. 6B, a timeout period may be introduced to prevent privacy revelation of the number/address in the local contact database. If approval to share the number/address is set as a default setting, expiration of the timeout period may result in sharing the number/address, where a default setting to not share the number/address would keep the number/address private. Particularly, the group member receives 620 a request for contact information. If the requested information is not found in the local contact database as determined at decision block 622, the device perform a default operation (e.g., notify the requesting device that the contact information was not found, do nothing, etc.). If the information is found, the group member device user may be given an opportunity to send the information to the requesting device. For example, the user may be presented with options to select via the user interface, such as to send the contact information to the requesting device or not to send the contact information to the requesting device. In the illustrated embodiment, the user is given some time period in which to respond in this manner. Thus, if the user does not respond 626 within some number (X) seconds, a default action 624 is performed such as to send the information or not to send the information. The time duration can be any desired duration (e.g., 5 seconds, 120 seconds, 5 minutes, etc.) If the user responds within the time period and provides the approval to share the information as determined at decision block 628, the contact information is sent 630 to the requester. Otherwise, if no approval to share the information was provided during the timeout period, a default operation 624 can be performed; for example to keep the information private and thus not share the information.

FIG. 6C involves an authentication approach, and is again considered from the viewpoint of a group member device receiving a request for the contact information. In this embodiment, whether the group member device has the requested information or not is revealed, such as by notifying the requesting device via the network(s). In one embodiment, a network element may store the contact information of each of the group members, and can quickly provide the notification of which group member device(s) has the requested information. In this manner, the requester can quickly know who has the requested information, but the information itself is not automatically provided to the requester. Rather, when the requester is informed of which device user(s) has the requested information, the requester can contact that device user(s) to get the information, or can request it from the network element that stores the information. If the requester is authorized, the information can then be provided to it. Particularly, FIG. 6C shows that a request is received 640, and if it is determined 642 whether the requester is an authenticated user. If not, the requester is notified 644 that the number was not available and therefore no contact information will be provided. If the requester is an authenticated user, it is determined 646 whether the local phonebook includes the number. If not, the requester is notified 644 that the number was not available and therefore no contact information will be provided. Otherwise, the requester may be notified 648 that the number was found. In this manner, the requester can contact the group member(s) that indicated that the number is available in its local database.

Figure 7:
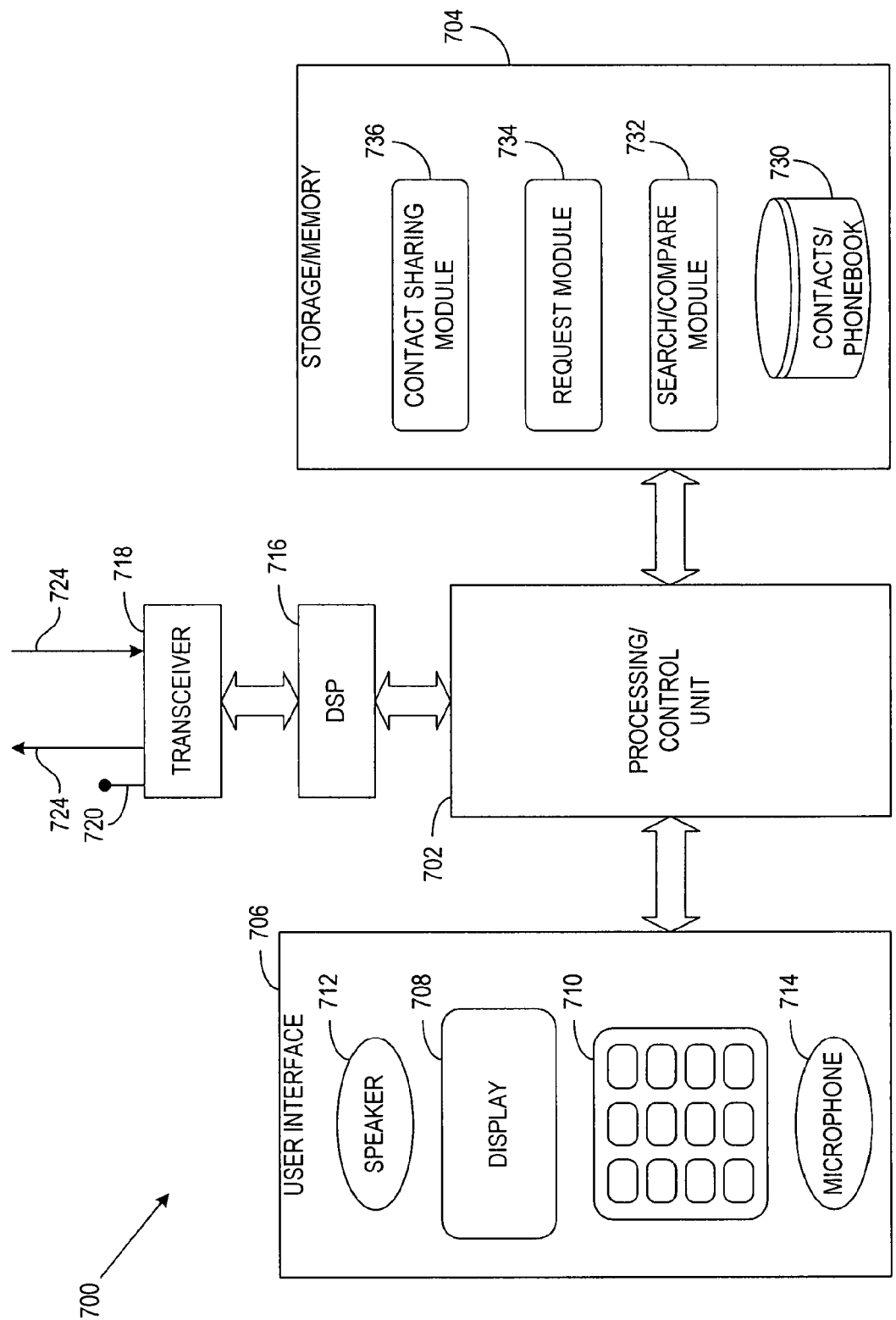
FIG. 7 illustrates a representative example of a mobile device which may serve as requesting device in accordance with the present invention.

Hardware, firmware, software or a combination thereof may be used to perform the device functions and operations in accordance with the invention. The requesting devices in accordance with the invention include communication devices such as, for example, mobile phones, PDAs and other wireless communicators, as well as landline computing systems and communicators. A representative example of a mobile device which may serve as a requesting device or a group member device in accordance with the present invention is illustrated in FIG. 7. The mobile device 700 utilizes computing systems to control and manage the conventional device activity as well as the functionality provided by the present invention. The representative mobile device 700 includes a computing system capable of carrying out operations in accordance with the invention. For example, the representative mobile device 700 includes a processing/control unit 702, such as a microprocessor, reduced instruction set computer (RISC), or other central processing module. The processing unit 702 need not be a single device, and may include one or more processors. For example, the processing unit may include a master processor and associated slave processors coupled to communicate with the master processor.

The processing unit 702 controls the basic functions of the mobile device 700 as dictated by programs available in the program storage/memory 704. The storage/memory 704 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the mobile device. The storage 704 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 700 via data signals, such as being downloaded electronically via one or more networks, such as the Internet and an intermediate wireless network(s).

For performing other standard mobile device functions, the processor 702 is also coupled to user-interface 706 associated with the mobile device 700. The user-interface (UI) 706 may include, for example, a display 708 such as a liquid crystal display, a keypad 710, speaker 712, and microphone 714. These and other UI components are coupled to the processor 702 as is known in the art. Other UI mechanisms may be employed, such as voice commands, switches, touch pad/screen, graphical user interface using a pointing device, trackball, joystick, or any other user interface mechanism.

The wireless device 700 may also include conventional circuitry for performing wireless transmissions over the mobile network. The DSP 716 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 718, generally coupled to an antenna 720, transmits the outgoing radio signals 722 and receives the incoming radio signals 724 associated with the mobile device 700. For example, signals 722, 724 may be transmitted to a CS network or PS network via a Radio Access Network (RAN), such as provided via GSM.

In the illustrated embodiment, the storage/memory 704 stores various client programs. The illustrated device 700 may represent the requesting device or the group member device that provides the requested information. In the illustrated embodiment, the device 700 includes a contacts database 730 and a search/compare module 732. A group member device that receives a request to provide contact information as part of the distributed contact database includes such a local contacts database 730. The search/compare module 732 performs the functions involved in locating the requested information in the database 730. The search/compare module may be implemented in hardware, or may include software instructions executable via the processing control unit(s) 702 to effect the search/compare functionality. In one embodiment, the requesting device searches its own contacts before requesting the information from the distributed contacts database, and therefore the requesting device may also include a contacts/phonebook 730 and search/compare module 732.

The requesting device may also include a request module 734 which creates the requests for transmission to the devices associated with the distributed contact database. The group member devices may include a contact sharing module 736 that performs the actions and makes decisions such as those in the examples of FIGS. 6A-6C. Analogous computing architecture is provided for computing devices and other landline communicators. Such a landline communicator may include a transceiver and/or other network interface to communicate information to and from the network.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   receiving a communication from a sending device;
   requesting sending device identification information from a distributed contact database fashioned from contact databases of communication devices in a group of communication devices, each communication device comprising an end user device; and
   receiving the requested sending device identification information from at least one of the communication devices in the group.

2. The method of claim 1, further comprising consulting a local contacts database for the sending device identification information, wherein requesting the sending device identification information from the distributed contact database is performed when the sending device identification information is not available in the local contacts database.

3. The method of claim 1, wherein only a portion of the contact database of a given one of the communication devices is made available for use in the distributed contact database.

4. The method of claim 1, wherein receiving a communication comprises receiving a voice call or a message from the sending device.

5. The method of claim 1, further comprising receiving a notification from one or more of the communication devices indicating that the requested sending device identification information will not be provided by the respective one of the communication devices.

6. The method of claim 1, wherein requesting sending device identification information comprises requesting information at least identifying a user of the sending device.

7. The method of claim 1, wherein requesting sending device identification information comprises requesting information more specifically identifying a user of the sending device than information received in connection with the communication from the sending device.

8. The method of claim 7, wherein the information received in connection with the communication from the sending device comprises information obtained in connection with a calling line identity technology.

9. The method of claim 7, wherein the information received in connection with the communication from the sending device comprises a phone number.

10. The method of claim 7, wherein the information received in connection with the communication from the sending device comprises at least a messaging address associated with the sending device.

11. The method of claim 7, wherein the information received in connection with the communication from the sending device comprises at least a messaging address associated with a user of the sending device.

12. The method of claim 1, wherein requesting sending device identification information comprises requesting the sending device identification information from each participating communication device in the group.

13. The method of claim 1, wherein requesting sending device identification information comprises sending at least one request for the sending device identification information to each of the communication devices of the group.

14. The method of claim 1, further comprising presenting the received sending device identification information.

15. The method of claim 1, further comprising:
determining that the requested sending device identification information will not be provided by at least another one of the communication devices irrespectively of whether the contact database of the at least another one communication device includes the requested identification information.

16. The method of claim 15, wherein the determination that the requested identification will not be provided by the at least one communication device is made prior to the receipt of the requested identification information.

17. The method of claim 15, wherein the at least another one communication device is temporarily not participating in the distributed contact database based on power resources, signal strength, network range, or a combination thereof of the at least another one communication device.

18. A method comprising:
associating with a plurality of communication devices to collectively formulate a distributed contact database, each communication device corresponding to an end user device;
receiving a request from a requesting one of the plurality of communication devices for identification information based on partial identification information provided via the request; and
providing the requested identification information to the requesting communication device when a local contact database includes the requested identification information.

19. The method of claim 18, further comprising applying participation rules, and providing the requested identification information to the requesting communication device according to the participation rules when the local contact database includes the requested identification information and if the participation rules allow it.

20. The method of claim 18, further comprising determining whether the requested identification information is approved for sharing, and providing the requested identification information to the requesting communication device according to participation rules when the local contact database includes the requested identification information.

21. The method of claim 18, further comprising notifying the requesting communication device that the requested identification information will not be provided to the requesting communication device.

22. The method of claim 18, further comprising providing an option to respond to the request within a time period, and performing a default operation when no action is taken by an expiration of the time period.

23. The method of claim 18, further comprising determining whether the requesting communication device is associated with an authenticated user having permission to obtain the identification information.

24. The method of claim 23, further comprising notifying the requesting communication device that the requested communication device is available, when the requesting communication device is associated with an authenticated user.

25. The method of claim 24, further comprising receiving, in response to the notification, a request for the identification information from the requesting communication device that is associated with the authenticated user.

26. The method of claim 18, further comprising making at least a portion of the local contact database ineligible for inclusion in the distributed contact database.

27. A method comprising:
receiving a communication from a sending device;
requesting sending device identification information from a distributed contact database fashioned from contact databases of one or more second devices, each device comprising an end user device; and
searching a respective local contact database to locate the requested sending device identification information, and providing the requested sending device identification information to the sending device when found.

28. The method of claim 27, further comprising affiliating the first device and the one or more second devices as a first tier group of the distributed contact database, wherein requesting sending device identification information from the distributed contact database comprises requesting sending device identification information from the first tier group of the distributed contact database.

29. The method of claim 28, further comprising affiliating at least one of the second devices with one or more third devices as a second tier group of the distributed contact database, and wherein sending the sending device identification information to the first device comprises receiving the sending device identification information from the second tier group and forwarding the sending device identification information to the first device.

30. An apparatus comprising:
a receiver configured to receive a communication from a sending device;
a processor configured to create a request for identification information of a user associated with the sending device;
a transmitter configured to transmit the request to a group of communication devices whose individual contact databases collectively form a distributed contact database, each communication device comprising an end user device, wherein the receiver is configured to receive the requested identification information from at least one of the communication devices of the group.

31. The apparatus as in claim 30, further comprising a storage device configured to store a local contacts database, wherein the processor is further configured to search the local contacts database for the identification information of the user associated with the sending device before directing the transmitter to transmit the request to the group of communication devices.

32. The apparatus as in claim 31, wherein the processor is further configured to direct the transmitter to transmit the request to the group of communication devices when the identification information is not found in the local contacts database.

33. The apparatus as in claim 30, wherein the receiver is further configured to receive a notification from at least one of the one or more of the communication devices indicating that the requested identification information will not be provided by the at least one of the communication devices.

34. The apparatus as in claim 30, further comprising a display configured to present a visual representation of the requested identification information.

35. The apparatus as in claim 30, further comprising a speaker configured to present an audio representation of the requested identification information.

36. An apparatus comprising:
- means for receiving a communication from a sending device;
- means for requesting sending device identification information from a distributed contact database fashioned from contact databases of a plurality of communication devices in a group of communication devices, each communication device comprising an end user device; and
- means for receiving the requested sending device identification information from at least one of the communication devices in the group.

37. An apparatus comprising:
- a receiver configured to receive a contact item request;
- a storage device configured to store a local contact database comprising a portion of a distributed contact database comprising contact databases of a plurality of communication devices, each communication device comprising an end user device;
- a processor configured to determine whether the requested contact item is stored in the local contact database; and
- a transmitter configured to transmit the requested contact item when the requested contact item is stored in the local contact database.

38. The apparatus of claim 37, wherein:
- the receiver is configured to receive the contact item request from a requesting device; and
- the transmitter is configured to transmit the requested contact item to the requesting device when the requested contact item is stored in the local contact database.

39. A system comprising a plurality of end user devices in a communication network, each end user device comprising a local contact database and configured to share the local contact database with at least one other end user device that belongs to a common group, wherein the local contact databases of the end user devices belonging to the common group collectively represent a distributed contact database, such each end user device is configured to transmit a request for identification information to the end user devices belonging to the common group, and receive the requested identification information from at least one of the end user devices.

\* \* \* \* \*